(12) United States Patent
Chevrette et al.

(10) Patent No.: US 8,988,249 B2
(45) Date of Patent: Mar. 24, 2015

(54) SYSTEM, METHOD AND INTEGRATED CIRCUIT CHIP FOR WIRELESS MULTI-NETWORK METER READING

(75) Inventors: Guy Chevrette, Ville Saint-Laurent (CA); Jean-Cedric Desrochers, La Prairie (CA); Yanick Duchesne, Deux-Montagnes (CA)

(73) Assignee: Connectif Solutions Inc., Montreal, Quebec (CA)

( * ) Notice: Subject to any disclaimer, the term of this patent is extended or adjusted under 35 U.S.C. 154(b) by 705 days.

(21) Appl. No.: 12/900,414

(22) Filed: Oct. 7, 2010

(65) Prior Publication Data

US 2011/0193718 A1    Aug. 11, 2011

Related U.S. Application Data

(60) Provisional application No. 61/249,786, filed on Oct. 8, 2009.

(51) Int. Cl.
| | | |
|---|---|---|
| G08B 23/00 | (2006.01) | |
| H04W 48/18 | (2009.01) | |
| G01D 4/02 | (2006.01) | |
| H04W 8/24 | (2009.01) | |
| H04W 88/06 | (2009.01) | |

(52) U.S. Cl.
CPC .............. H04W 48/18 (2013.01); G01D 4/02 (2013.01); *H04W 8/245* (2013.01); *H04W 88/06* (2013.01); *Y02B 90/241* (2013.01); *Y02B 90/246* (2013.01); *Y02B 90/243* (2013.01); *Y04S 20/30* (2013.01); *Y04S 20/32* (2013.01); *Y04S 20/325* (2013.01); *Y04S 20/42* (2013.01); *Y02B 90/24* (2013.01)

USPC ...................................... 340/870.02; 455/558

(58) Field of Classification Search
CPC .......... Y04S 20/42; H04W 48/17; G01D 4/02
USPC ............ 340/870.07, 870.02–870.03; 455/558
See application file for complete search history.

(56) References Cited

U.S. PATENT DOCUMENTS

| | | | |
|---|---|---|---|
| 6,369,719 B1 | 4/2002 | Tracy et al. | 340/870.02 |
| 6,657,552 B2 | 12/2003 | Belski et al. | 340/870.02 |

(Continued)

FOREIGN PATENT DOCUMENTS

| | | |
|---|---|---|
| CA | 2624033 | 9/2008 |
| CN | 201203460 | 3/2009 |

(Continued)

*Primary Examiner* — Albert Wong
(74) *Attorney, Agent, or Firm* — Roberts & Roberts, LLP

(57) ABSTRACT

A wireless monitoring system comprises a remote asset about which data is to be collected and a wireless data-transfer device connected to the remote asset. The wireless device includes a radiofrequency transceiver and a chip having a memory for storing a plurality of subscriber identifiers corresponding to different wireless networks and for further storing logic that constitutes network selection rules for selecting one of the wireless networks to use for transmission of the data. In a GSM/UMTS implementation of this technology, the subscriber identifier is the IMSI and the chip is a Subscriber Identity Module (SIM) chip or card. By using multiple IMSI's, the wireless data-transfer device connected to the remote asset may switch seamlessly between wireless networks. A new IMSI (for a new network) may be provisioned over the air to enable the device to communicate over a new network for which it did not previously have an IMSI.

23 Claims, 11 Drawing Sheets

(56) References Cited

U.S. PATENT DOCUMENTS

| | | | |
|---|---|---|---|
| 7,202,800 B2 | 4/2007 | Choi | 340/870.02 |
| 7,596,435 B1 | 9/2009 | Tripathi et al. | 701/29 |
| 7,868,782 B2 * | 1/2011 | Ehrke et al. | 340/870.12 |
| 2005/0225455 A1 * | 10/2005 | Patterson et al. | 340/870.02 |
| 2008/0024320 A1 * | 1/2008 | Ehrke et al. | 340/870.02 |
| 2009/0051566 A1 | 2/2009 | Olsen et al. | 340/825.49 |
| 2009/0167558 A1 | 7/2009 | Borleske et al. | 340/870.07 |
| 2009/0313497 A1 | 12/2009 | Lumbroso et al. | 714/3 |

FOREIGN PATENT DOCUMENTS

| | | |
|---|---|---|
| GB | 2450880 | 1/2009 |
| JP | 2006-211280 A | 8/2006 |
| WO | WO 2008/098149 | 8/2008 |
| WO | WO2009/084016 | 7/2009 |

\* cited by examiner

SYSTEM, METHOD AND INTEGRATED CIRCUIT CHIP FOR WIRELESS MULTI-NETWORK METER READING

CROSS-REFERENCE TO RELATED APPLICATIONS

This application claims priority from U.S. Provisional Patent Application 61/249,786 entitled "SYSTEM, METHOD AND INTEGRATED CIRCUIT CHIP FOR WIRELESS MULTI-NETWORK METER READING" which was filed Oct. 8, 2009.

TECHNICAL FIELD

The present invention relates generally to telemetry and telematics and, in particular, to wireless device-reading systems where device data is transmitted over the air.

BACKGROUND

Various technologies exist for collecting and communicating metering data from a meter to a remotely located recipient over a wireless communication link. Some examples are disclosed in U.S. Pat. No. 6,369,719 (Tracy et al.) entitled "Apparatus and Method for Collecting and Transmitting Utility Meter Data and Other Information via a Wireless Network", U.S. Pat. No. 6,657,552 (Belski et al.) entitled "System and Method for Communicating and Control of Automated Meter Reading", U.S. Pat. No. 7,202,800 (Choi) entitled "Mobile Communication-Based Remote Meter Reading System and Method", UK Patent Application Publication GB2450880 (Middleton et al.) entitled "Device for Remotely Monitoring a Utility Meter", Canadian Patent Application 2,624,033 (Bakken et al.) entitled "Method and System for Collecting Meter Readings in Wireless Transmissions from Unlisted Customers", Chinese Patent Application Publication CN201203460 entitled "Remote Vehicle Mounted Metering and Monitoring Instrument", and PCT Patent Application Publication WO2009/084016 (Hari et al.) entitled "A Device with a GSM Chip for Measuring and Recording and Transferring the Electrical Parameters and Burning Hours of CFL Lamp".

Although it is known to use a cellular network such as, for example, a GSM network to transmit metering data, this technology suffers from one substantial drawback in that the data-transfer device is tied to one specific network or carrier. If that network is inoperative for whatever reason, the device cannot transmit its data. If the user of the metering device wishes to switch to a different carrier offering better service or lower cost, this conventionally requires that the SIM be replaced to provide the device with a new IMSI. This has proven to be a substantial obstacle in the adoption by utility companies of cellular-based remote metering since these utilities may be loath to commit to a long-term contract with a particular wireless carrier. There has not been to date a wireless meter-reading technology that addresses and overcomes these deficiencies.

Analogous technical problems arise in a myriad of other applications where a remote wireless-enabled asset is to be monitored. For example, remote monitoring of automobiles, trucks, buses, motorcycles, watercraft or other vehicles, is also limited in that the data-transfer device in the vehicle is tied to one specific network or carrier.

Similarly, in the realms of smart home monitoring and tele-health applications, the data-transfer devices are tied to one specific network or carrier.

Whether the application is automotive, tele-health or utility meter reading, the same problem persists: if the current network is inoperative, the device cannot transmit its data. If the user wishes to switch to a different carrier, this conventionally requires that the SIM be replaced to provide the device with a new IMSI.

Therefore, there remains a need for a system and method that overcomes, or at least partially mitigates, the deficiencies of the prior art.

SUMMARY

In broad terms, the present invention provides an innovative system, method and integrated circuit chip for wireless multi-network data collection, device-control, telemetry, and telematics. This is accomplished by providing a wireless data-transfer device with multiple subscriber identifiers (e.g. multiple IMSI's) for accessing different wireless networks. In operation, the wireless data-transfer device is connected or linked, via either wired or wireless interfaces, to one or more remote assets such as utility meters, vehicles, appliances, or tele-health monitors to name but a few applications. Asset data (or meter data) is collected from the one or more assets or meters and transmitted to a data recipient using one of a plurality of different wireless networks that are potentially available to the device. The wireless data-transfer device contains a chip having a memory that stores more than one subscriber identifier (e.g. IMSI). Each IMSI allows access to a different wireless network. Multiple subscriber identifiers (e.g. multiple IMSI's) are provided on the chip to enable the wireless data-transfer device to choose which one of a plurality of wireless networks to use to transmit the asset data. Because the chip contains multiple subscriber identifiers (e.g. multiple IMSI's), the wireless data-transfer device is able to select one particular network from among the plurality of wireless networks. Network selection rules may be provided as logic on the chip to enable the chip to select which network to use for data transmission. The multiple IMSI's (or other subscriber identifiers) may be pre-loaded on the chip for each of the wireless networks or, alternatively, may be provisioned over-the-air.

Accordingly, one main aspect of the present invention is a wireless data-collection system comprising a remote asset for collecting asset data and a wireless data-transfer device connected to the asset. The wireless data-transfer device includes a radiofrequency transceiver for wirelessly transmitting the asset data and an integrated circuit chip having a memory for storing a plurality of subscriber identifiers corresponding to different wireless networks and for further storing logic that apply network selection rules for selecting one of the wireless networks to use for transmission of the asset data.

The chip in the wireless data-transfer device may be, or include, a Subscriber Identity Module (SIM) or equivalent in which case each subscriber identifier is an IMSI (or equivalent).

The system may include a device management platform for receiving the asset data from the wireless data-transfer device connected to the remote asset and for communicating control commands to the remote asset via the wireless data-transfer device.

The system may also include a subscriber management platform for subscriber provisioning, the subscriber management platform enabling creation, activation, deactivation and removal of subscriber accounts.

Another main aspect of the present invention is a method of using a wireless data-transfer device to transmit remote asset data from a remote asset to a data recipient. The method entails steps of collecting the remote asset data via an interface of the wireless data-transfer device that is connected to the remote asset, determining which one of a plurality of wireless networks to utilize for transmitting the asset data to the recipient, and establishing wireless communication with one of the wireless networks by selecting a subscriber identifier stored in a memory of the wireless data-transfer device.

For main implementations of this method, the subscriber identifier is an IMSI stored in a SIM chip, SIM card or the like.

The method may entail receiving subscriber identifiers over the air for new, or previously unavailable, wireless networks.

Yet a further main aspect of the present invention is an integrated circuit chip for use in a wireless data-collecting or asset-monitoring system. The chip has a memory for storing a plurality of different subscriber identifiers and logic for selecting one subscriber identifier from among the plurality of subscriber identifiers stored in the memory of the chip, each subscriber identifier corresponding to a different wireless network over which remote asset data from a remote asset may be communicated to a data recipient. In main implementations, as noted above, the subscriber identifier is an IMSI or equivalent and the chip may be or comprise a Subscriber Identity Module (SIM) or equivalent.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals. It should furthermore be noted that the drawings are not necessarily to scale.

DETAILED DESCRIPTION

In general, and by way of introduction, the present invention enables wireless multi-network data-collection, asset monitoring, telemetry and telematics. A wireless data-transfer device contains an integrated circuit chip having a memory that stores multiple subscriber identifiers (e.g. multiple IMSI's for a GSM, UMTS or LTE implementation). These multiple subscriber identifiers (e.g. multiple IMSI's) enable access to a plurality of different wireless networks, one of which can be selected at any time by the wireless data-transfer device (based on network selection rules) or by any external agent controlling said device in order to transmit the asset data over any desired network for which a valid IMSI (or other subscriber identifier) has been provided. This enables the wireless data-transfer device to instantly and intelligently switch between carriers, thereby providing communication redundancy and the ability to optimize data-transmission charges, or to use different networks for different types of assets and/or recipients. This radical new approach represents a vast improvement over prior-art wireless metering technologies which are conventionally bound to one carrier. The remote asset may be a utility meter, a vehicle (such as a car, truck, bus, motorcycle, ATV, snowmobile, watercraft, aircraft, etc.), machinery, equipment, or appliance (e.g. HVAC unit, Point-of-Sale (POS) device, smart appliance, etc.) or any type of monitoring device (alarm system, tele-health monitor, etc.) In other words, this technology can be applied to virtually any remote asset that is deployed globally or at least over an expansive area.

System Overview

Figure 1:
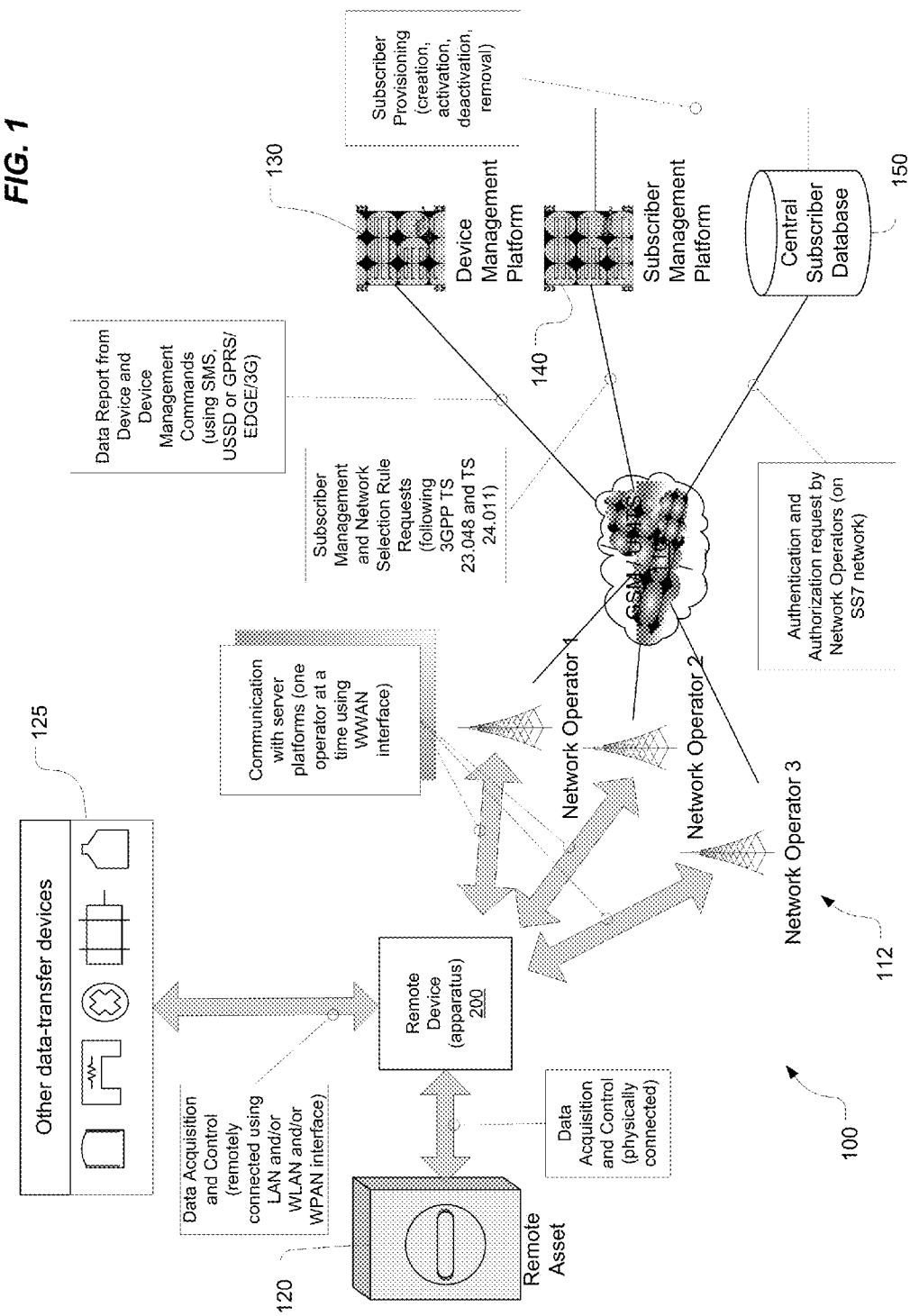
FIG. 1 is a schematic overview of the system for multi-network wireless reading of data-transfer devices in remote assets in accordance with one embodiment of the present invention.

FIG. 1 schematically depicts a novel system for wireless data-collection, monitoring, telemetry or telematics in accordance with one embodiment of the present invention. The system, which is designated generally by reference numeral 100, operates in a wireless or mobile communication environment such as, for example, a GSM/UMTS network 110. A plurality of different network operators 112 (or wireless carriers or mobile network operators) operate in the environment to provide wireless connectivity and communications. For the specific example presented in FIG. 1, there are shown three network operators/carriers (Network Operator 1, Network Operator 2, and Network Operator 3) although, in theory, there could be any number of mobile network operators.

Figure 6:
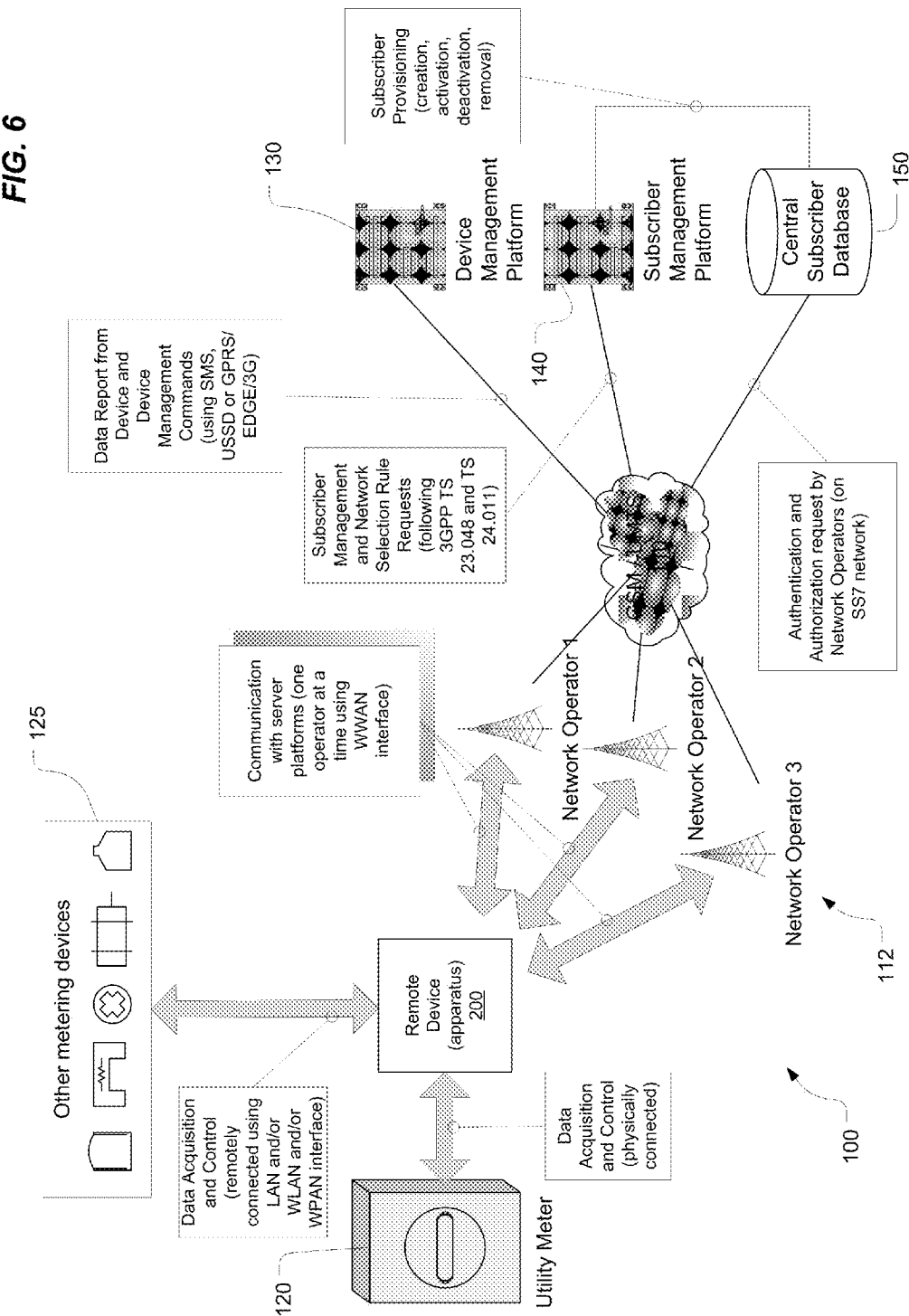
FIG. 6 is a schematic overview of the system for multi-network wireless meter reading in accordance with one embodiment of the present invention.
Figure 7:
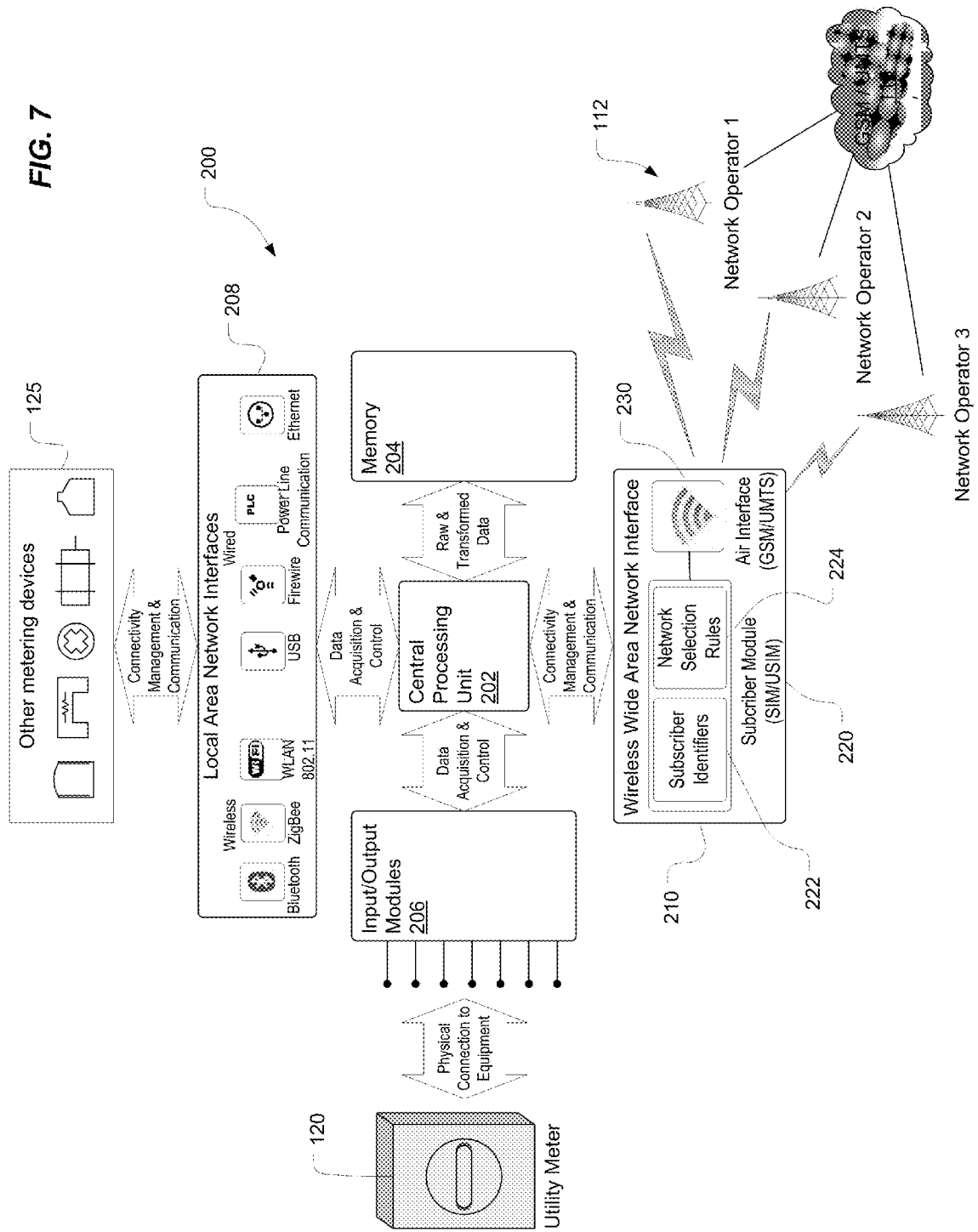
FIG. 7 is a schematic depiction of certain main components of the wireless data-transfer device as would be used in the system presented in FIG. 6.
Figure 8:
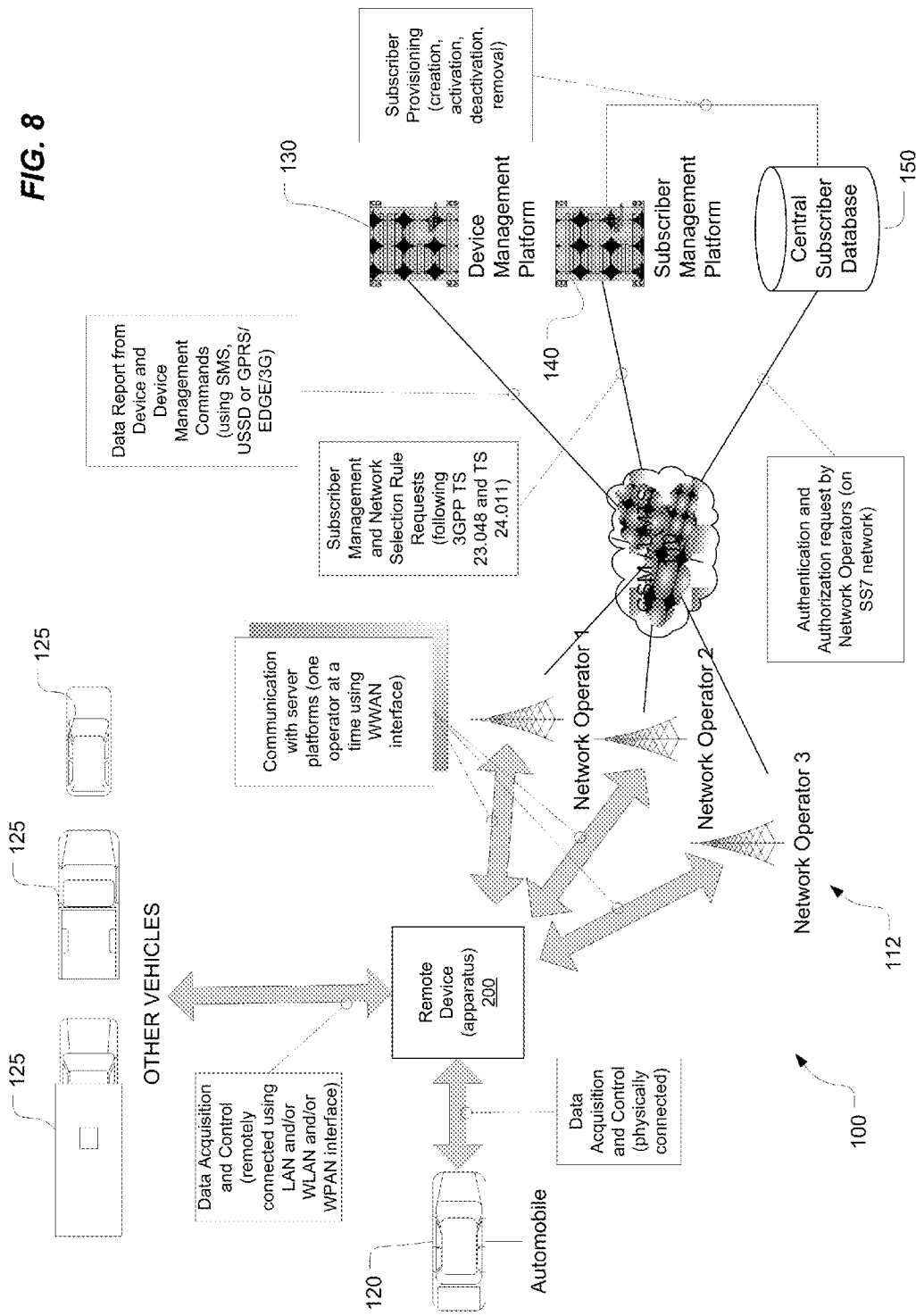
FIG. 8 is a schematic overview of the system for multi-network wireless reading of a data-transfer device installed in a vehicle in accordance with one embodiment of the present invention.
Figure 9:
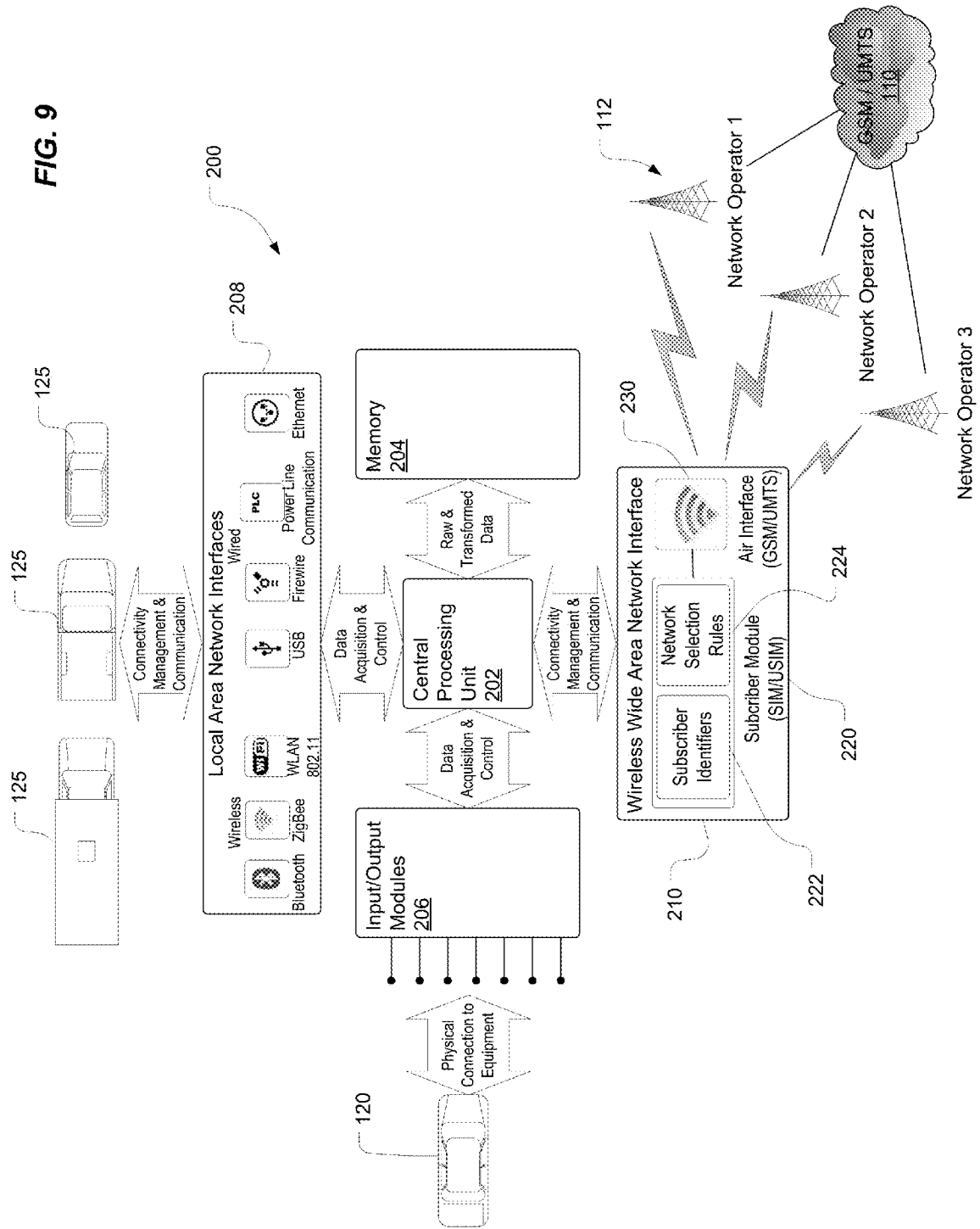
FIG. 9 is a schematic depiction of certain main components of the wireless data-transfer device as would be used in the system presented in FIG. 8.
Figure 10:
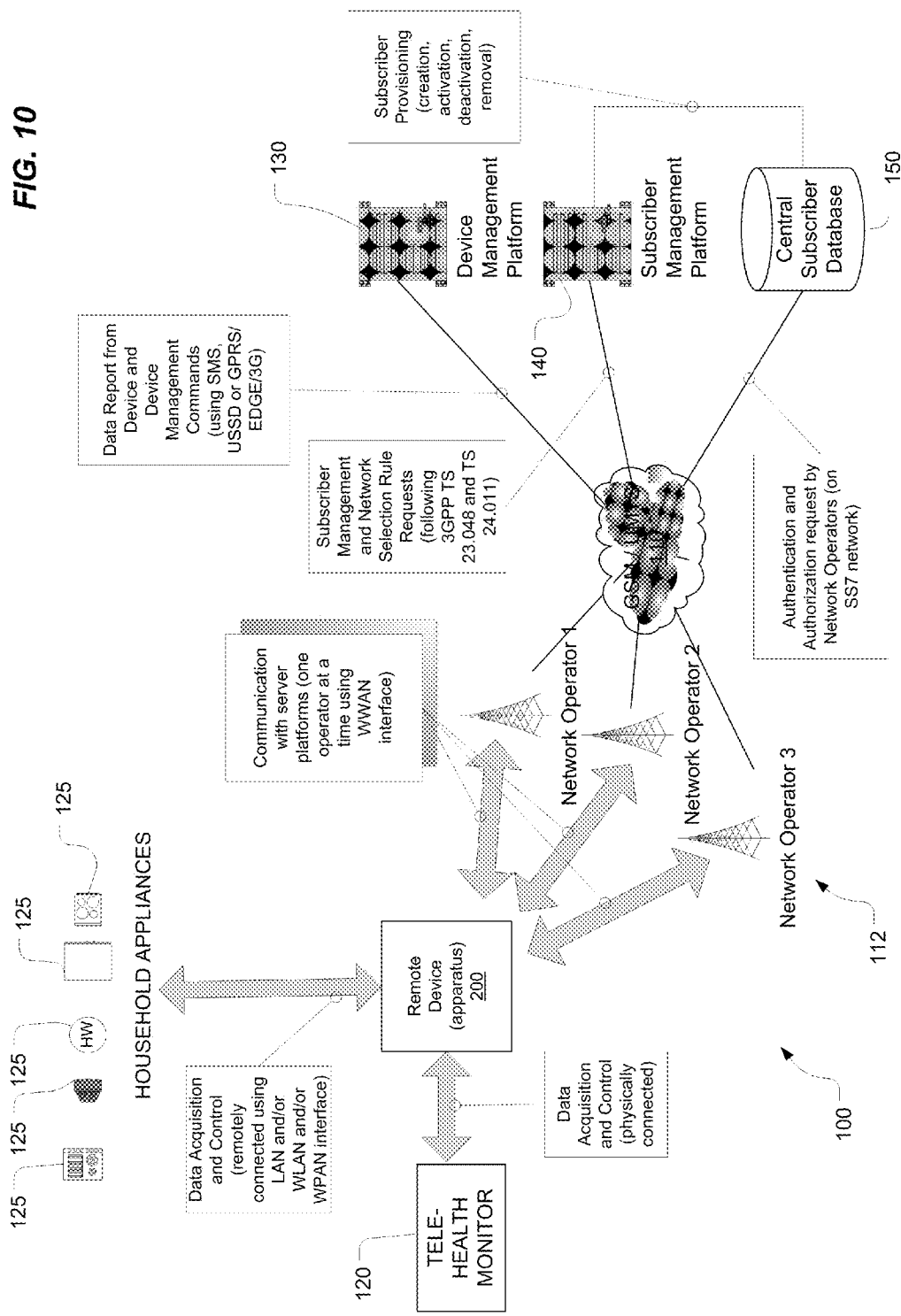
FIG. 10 is a schematic overview of the system for multi-network wireless reading of data-transfer devices used adapted for tele-health and smart home applications in accordance with one embodiment of the present invention.
Figure 11:
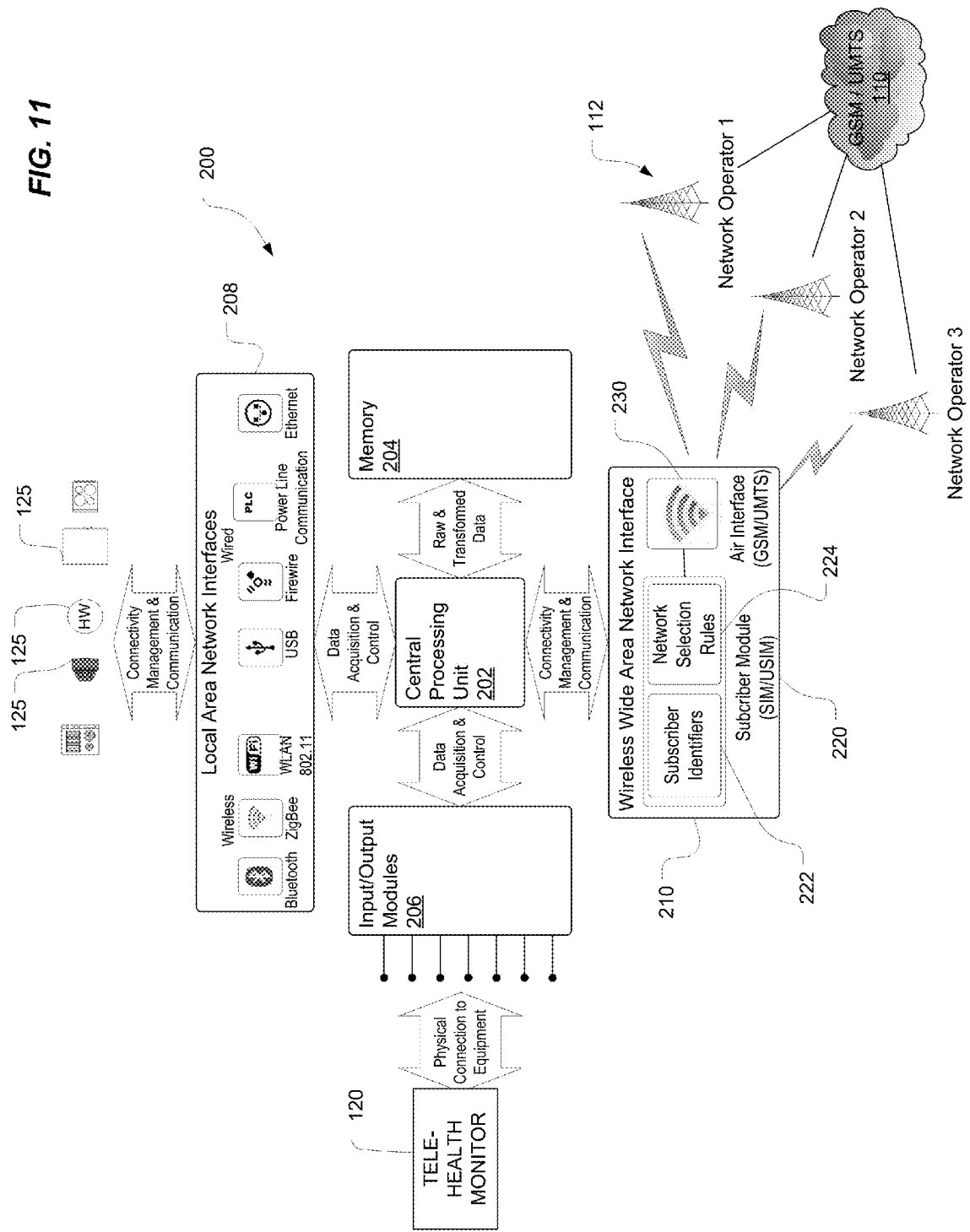
FIG. 11 is a schematic depiction of certain main components of the wireless data-transfer device as would be used in the system presented in FIG. 10.

As shown in FIG. 1, the system 100 includes a remote asset 120 (e.g. utility meter, car, smart appliance, tele-health monitor, etc.) for collecting asset data. Other remote assets 125 may be present, as shown by way of example in FIG. 1. The technology will be described in general with reference to a generic remote asset, illustrated in FIG. 1 and FIG. 2. However, it should be appreciated that the technology may be applied to utility meters, for example, as shown in FIG. 6 and FIG. 7, these assets may be utility meters, e.g. residential or commercial electricity consumption meters, gas consumption meters, water consumption meters, etc. The meters may also be appliance-specific meters, such as a meter on a hot-water tank, air-conditioning unit, refrigerator, etc. This novel technology may be used to transmit data from one meter or from a plurality of different meters. As another tangible example, the technology may also be applied to the monitoring of vehicles (or other vehicle telematics) as shown in FIG. 8 and FIG. 9. As yet a further example, the technology may furthermore be applied to smart appliances in the household and/or to tele-health monitors as shown in FIG. 10 and FIG. 11. As such, it should be understood that a remote asset may be a mobile asset or an immobile asset. The remote asset may have its own sensors or transducers for generating its own data and for sharing this data with the data-transfer device. Alternatively, the data-transfer device may include one or more sensors to collects its own data about the asset. For example, the asset may have its own internal GPS chipset for determining its geographical position. This GPS data would then be shared with the data-transfer device. Alternatively, the data-transfer device may have a GPS chipset for determining the location of the asset. In the case where both the asset and the data-transfer device have the same sensor, the data-transfer device may either deactivate its own sensor and obtain data only from the asset or it may choose to utilize only its own data.

Figure 2:
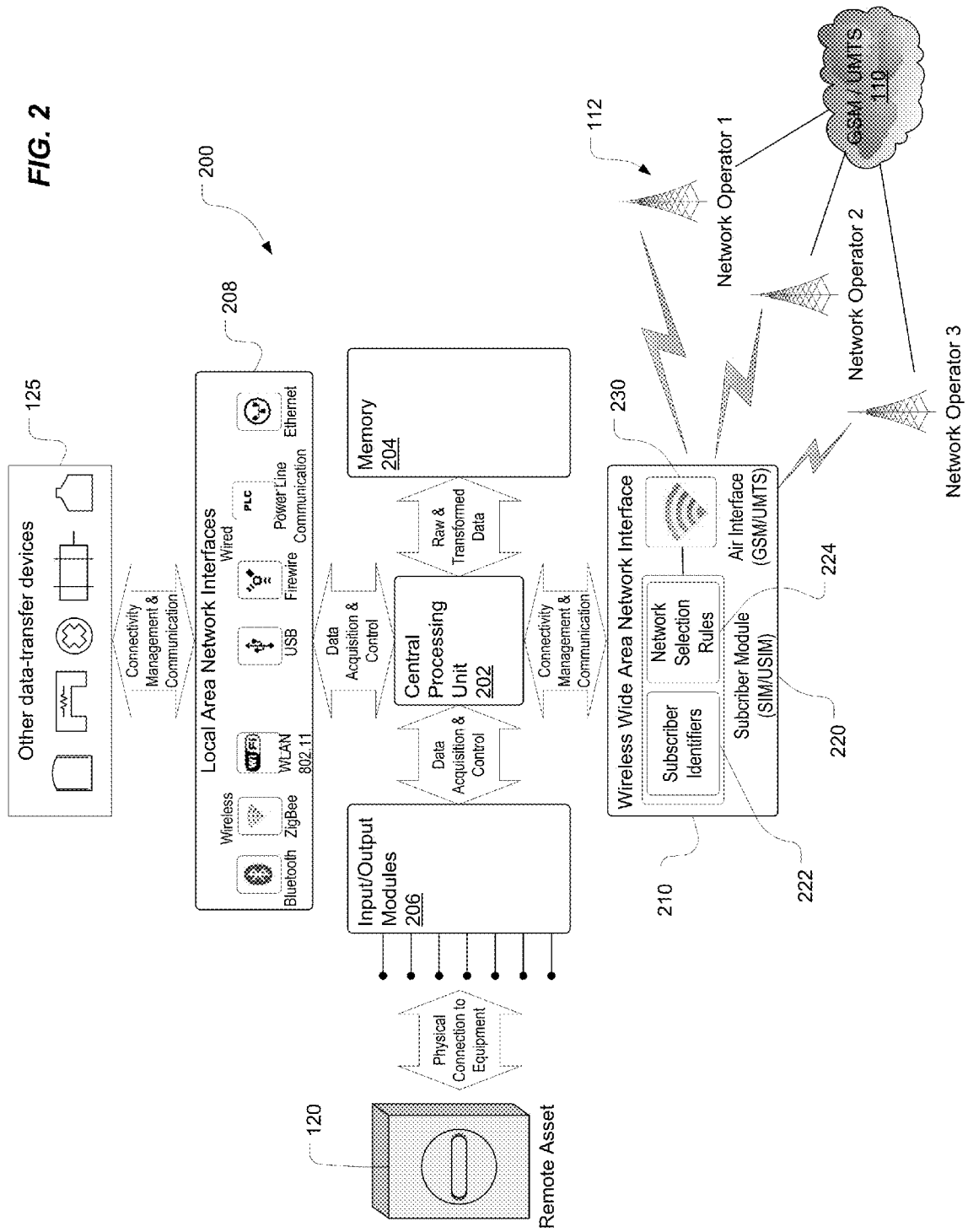
FIG. 2 is a schematic depiction of certain main components of the wireless data-transfer device as would be used in the system presented in FIG. 1.

Referring now back to FIG. 1 and FIG. 2, the system 100 also includes a wireless data-transfer device 200 (labelled as "remote device" in FIG. 1) connected to the remote asset 120. The wireless data-transfer device may optionally also be connected to the other remote assets 125. In theory, any number of remote assets 120, 125 may be connected to, or in communication with, the data-transfer device 200. The data may be collected by wired or wireless links between the device 200 and the various assets.

The wireless data-transfer 200 device has a radiofrequency transceiver (wireless wide area network interface) for wirelessly transmitting the data and an integrated circuit chip (to be described in greater detail below) having a memory for storing a plurality of subscriber identifiers corresponding to different wireless networks and for further storing logic that apply network selection rules for selecting one of the wireless networks to use for transmission of the data.

As further depicted in FIG. 1, the system 100 may include a device management platform 130. This device management platform 130 receives data reports from the device 200 and issues device management commands. These communications may use SMS, USSD or GPRS/EDGE/3G technologies.

As further depicted in FIG. 1, the system 100 may further include a subscriber management platform 140 for subscriber provisioning. This subscriber management platform 140 enables creation, activation, deactivation and removal of subscriber accounts. Subscriber account data may be stored in a central subscriber database 150.

The system depicted in FIG. 1 is presented by way of example only and it will be appreciated that many variations, modifications and additions may be made without departing from the general underlying inventive concept(s).

The wireless data-transfer device 200 is presented in greater detail in FIG. 2. In the embodiment presented in FIG. 2, this device 200 includes a central processing unit (CPU) 202 (also referred to herein as a processor or microprocessor) and a memory 204 for storing raw and transformed data, as the case may be. The CPU 202 may interact, as shown, with input/output modules (I/O ports) 206 for data acquisition and control. The CPU may also interact with local area network (LAN) interfaces 208 for data acquisition and control. As shown by way of example, the LAN interfaces may be Bluetooth®, ZigBee®, WLAN (IEEE 802.11), USB, Firewire™, Power Line Communication, Ethernet (IEEE 802.3), WPAN, or any other equivalent or suitable interface.

As further depicted in FIG. 2, the wireless data-transfer device 200 includes a wireless wide area network (WWAN) interface 210 for interfacing with the base station towers of the various networks 112 of the GSM/UMTS network 110. The WWAN interface 210 includes a Subscriber Identity Module (SIM/USIM) 220 and an air interface 230. The air interface 230 in this example is configured for GSM/UMTS mobile communications. The air interface includes a radiofrequency transceiver for sending and receiving data over the air. The SIM/USIM 220 includes a memory for storing subscriber identifiers 222 (e.g. multiple IMSI's) and logic defining a set of network selection rules 224. The network selection rules are applied to determine which network 112 to utilize for the transmission of data. The network selection rules may be configurable and/or reconfigurable either at the device 200 and/or over-the-air by an external agent such as, for example, by the subscriber management platform 140. The tremendous flexibility of this system is derived from the ingenious inclusion on the SIM/USIM 222 of a plurality of different IMSI's, each IMSI allowing the device to connect to a different wireless network 112. The device can thus deliver data reports to a remote data recipient unconstrained by an one carrier or mobile network operator (MNO). The device can switch to a different MNO if the default MNO has a service interruption or simply to avail oneself of better pricing (lower data charges). Furthermore, a new IMSI can be sent over the air to the device 200 if it desired to provide access to a new or previously unavailable MNO.

As will be appreciated, this technology can be adapted for use with 4G LTE networks as these eventually come online.

Integrated Circuit Chip

From the foregoing it should be apparent that the core of the inventive system presented above is the chip, which could also be in the form of a card or integrated circuit. All of these are intended to be encompassed within the term "integrated circuit chip" that is used herein. This integrated circuit chip contains the multiple subscriber identifiers. For GSM/UMTS/LTE, the chip may simply be a Universal Integrated Circuit Card (UICC) that stores the multiple IMSI's in the SIM/USIM. The chip thus contains memory storing the IMSI's or other subscriber identifiers and logic for implementing the network selection rules. In one example embodiment, the chip is a UICC smart card (or chip equivalent) having its own CPU, ROM, RAM, EEPROM and I/O circuits.

In the main implementations of this technology, a single chip (e.g. a UICC with a single SIM) is utilized to stored the multiple IMSI's or other subscriber identifiers. However, it might be possible to provide the same multi-IMSI capability using multiple SIM cards in the same device where the IMSI on each SIM card is accessible by a central controller or manager.

Optionally, the chip may comprise logic to enable an IMSI to be added to the memory or to be deleted from memory, either locally or via a command sent over the air, for example, from the device management platform.

Method

Figure 3:
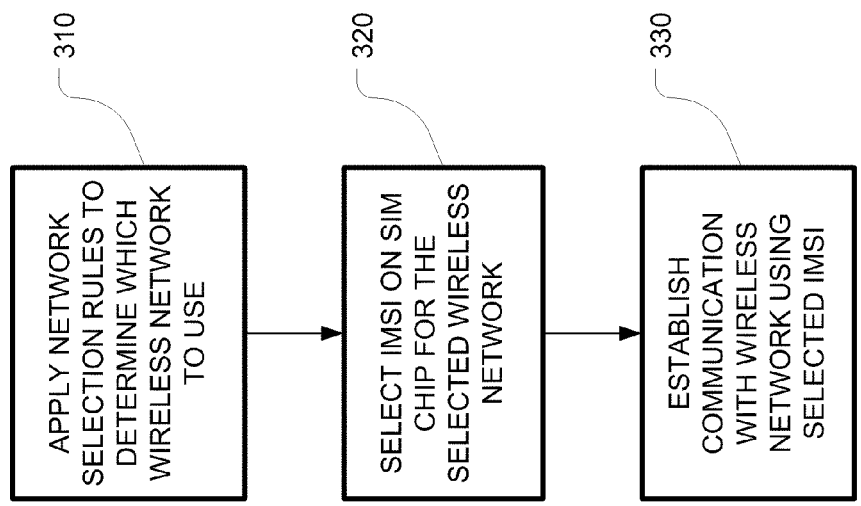
FIG. 3 is a flowchart depicting main steps of a method of using a wireless data-transfer device to transmit data from a remote asset to a data recipient.

Another aspect of this invention is a method of using a wireless data-transfer device to communicate data from a remote asset to a remotely located recipient. A first aspect of this method is network selection. This aspect of the method is summarized generally by the flowchart presented in FIG. 3. As shown in this flowchart, the network-selection aspect of the method in broad terms entails a first step of determining which one of a plurality of wireless networks to utilize for transmitting the asset data to the recipient. Accordingly, at step 310, the network selection rules are applied to select a wireless network for transmitting the data. This may be based on the type of data (which asset has provided the data), the intended recipient, the time of day, data transmission charges, or any other factor. At step 320, the IMSI (or other subscriber identifier) is then selected from the chip (e.g. SIM) corresponding to the wireless network that has been chosen. At step 330, a wireless link is established with the chosen wireless network using the IMSI for that chosen network.

Figure 4:
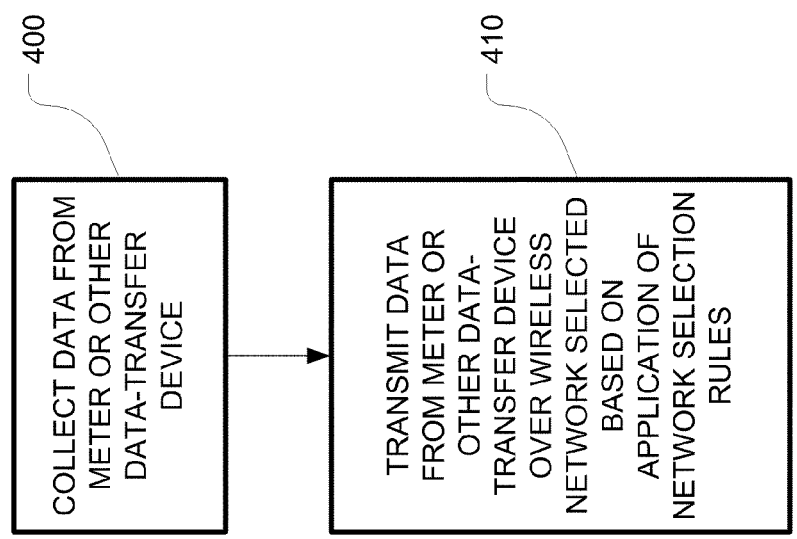
FIG. 4 is a flowchart depicting further steps of transmitting the data over the wireless network that has been selected based on the network selection rules.

FIG. 4 depicts, in broad terms, the transmission of asset data. In general, this involves a step 400 of collecting the asset data. This is accomplished via an interface of the wireless data-transfer device that is connected to the asset. Once the asset data has been received (i.e. colleted), it may be stored, cached or buffered for subsequent transmission in step 410. Transmission of the asset data may be done periodically (at predetermined intervals or upon demand by an external agent). The device may transmit the asset data using a default network, which has been previously selected using the network selection rules, or by re-applying the network selection rules prior to transmitting to ensure that the network selection is up to date.

Figure 5:
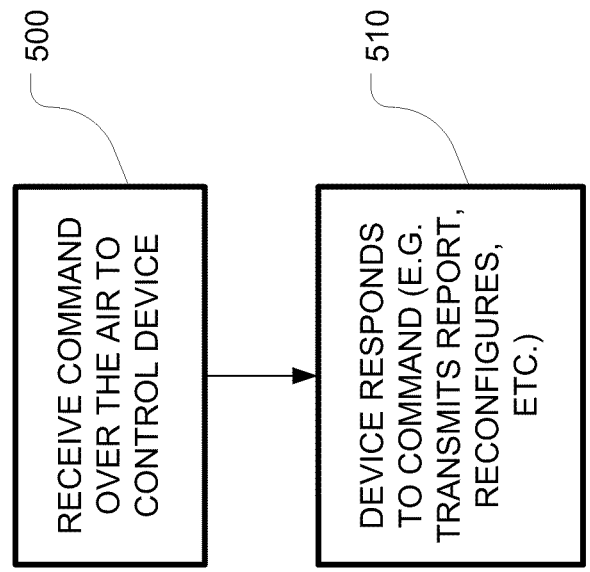
FIG. 5 is a flowchart depicting steps of a method of remotely controlling the data-transfer device.

FIG. 5 depicts a remote command and control capability whereby the data-transfer device and/or its associated asset may be controlled over the air by issuing commands (signals or messages) to the device and/or its associated asset using a predetermined protocol. As depicted in FIG. 5, at step 500 the data-transfer device receives a command. At step 510, the data-transfer device reacts or responds to the command. This command may incite the data-transfer device to, for example, transmit a report immediately, reconfigure itself, change the type of data being collected, change the frequency or format of the periodic reports, etc. The command may also be a command intended for the remote asset itself. For example, the command may be to disable or deactivate the asset, or alternatively activate the asset, adjust its operating parameters, etc.

The subscriber identifier for a GSM or UMTS implementation is the International Mobile Subscriber Identity (IMSI). As is well known in the art, an IMSI typically contains fifteen digits. The first three digits represent the Mobile Country Code (MCC). The next two or three digits represent the Mobile Network Code (MNC) (two for the European standard or three for the North American standard). The remaining digits represent the Mobile Station Identification Number (MSIN) within the network's customer base. Therefore, the network selection rules may identify which network to use based on the MNC portion of the IMSI.

Once the IMSI has been selected, the wireless data-transfer device 200, just like a GSM/UMTS phone, performs an IMSI Attach. As is already well understood in the art, the IMSI Attach involves the device 200 requesting a channel and sending either an IMSI or a Temporary Mobile Subscriber Identity (TMSI) to the base station whereupon the base station acknowledges the message and forwards the request (and IMSI) to the Mobile Switching Center/Visitor Location Register (MSC/VLR). The MSC/VLR forwards the IMSI to the Home Location Register (HLR) for verification. The HLR forwards the IMSI to the Authentication Center (AuC) for authentication triplets (RAND, Kc, SRES). The AuC generates the triplets and sends them back with the IMSI to the HLR. The HLR then validates the IMSI to make sure that the device with that IMSI is actually entitled to be on the network. Unlike a regular GSM phone, with the novel multi-IMSI device 200 of the present invention, if the selected IMSI is not entitled for the given network and verification fails, the device 200 may automatically try a different IMSI stored in the SIM chip. This provides another form of backup or redundancy in case an administrative glitch or subscription lapse causes the first selected IMSI to be rejected. Alternatively, this rejection may be communicated to the subscriber management platform to have the platform immediately provide a new IMSI over the air. If, on the other hand, validation is successful, the HLR then forwards the IMSI and the authentication triplets to the MSC/VLR. Authentication is then performed using the RAND challenge and signed response (SRES) as it would for a single-IMSI device (i.e. a regular GSM phone). If the SRES matches the pre-computed value in the base station, the device can then communicate using an encrypted algorithm in the SIM card (e.g. A5) for which the base station has received the session key Kc. The encryption portion is thus also the same as for regular GSM/UMTS communications. Logic for implementing the A3, A8 and A5 encryption algorithms are also provided in the SIM/USIM of the device 200, as it would for any other GSM/UMTS phone.

In one particular implementation of this technology, the subscriber management platform may act as an HLR (home location register) in the sense that network validation could be performed at that platform.

From the foregoing, it should be appreciated that data collection, monitoring, metering, telemetry, and telematics is not limited solely to obtaining client or consumer data. For example, in the context of utility meters, obtaining metering data is not limited solely to measuring consumption of a given resource, e.g. electricity, gas, water, etc., but applies broadly to the measurement of any parameter or parameters whatsoever relating to a remote appliance, system, machine, etc.

General, it should be borne in mind that data-collection, telemetry and metering may entail measuring, sensing or transducing any quantity, value, or parameter or obtaining any sort of data or feedback signals from any devices, appliances (e.g. smart appliances), equipment, machines, systems, powerplants, vehicles, etc. from which the wireless device 200 may obtain data. It should be apparent that this technology has vast applicability in numerous areas of endeavour beyond the examples presented herein. For example, the technology may be used to monitor and control household appliances, home security systems, HVAC systems, power generators, cars, aircraft, ships, trains, to name but a few.

In addition to transmitting metering data, the wireless communication link may also be used to receive commands from an end-user, utility, manager, owner or other entity who has an interest in regulating or controlling the device, vehicle, appliance, machine, etc. from which metering data has been obtained. In addition to controlling or monitoring, the end-user may dictate over which network the data is to be delivered. Changes may be effected instantly by sending a command over the air. This enables a completely network-independent or network-agnostic solution for wireless metering which has hitherto not been possible using prior-art technologies.

Finally, it should be noted that this novel multi-IMSI technology enables different services to be delivered over different networks. For example, a multi-IMSI device installed in a smart home would enable a different IMSI to be used for different services, e.g. one IMSI could be used for the home security system, a separate IMSI could be used for a medical monitor for a house-bound patient, and another IMSI could be used to manage the household's energy consumption.

The present invention has been described in terms of specific embodiments, examples, implementations and configurations which are intended to be exemplary or illustrative only. Other variants, modifications, refinements and applications of this innovative technology will become readily apparent to those of ordinary skill in the art who have had the benefit of reading this disclosure. Such variants, modifications, refinements and applications fall within the ambit and scope of the present invention. Accordingly, the scope of the exclusive right sought by the Applicant for the present invention is intended to be limited solely by the appended claims and their legal equivalents.

The invention claimed is:

1. A wireless data-collection system comprising:
   a remote asset; and
   a wireless data-transfer device connected to the remote asset for collecting data from or about the remote asset, the wireless device including:
   a radiofrequency transceiver for wirelessly transmitting the data; and
   an integrated circuit chip having a memory for storing a plurality of subscriber identifiers corresponding to different wireless networks and for further storing network selection rules applied by a processor for selecting one subscriber identifier and for causing the radiofrequency transceiver to transmit the data using one of the wireless networks corresponding to the subscriber identifier selected by the processor, wherein the wireless data-transfer device is configured to wirelessly receive a new subscriber identifier for a new wireless network.

2. The system as claimed in claim 1 wherein the chip comprises a Subscriber Identity Module (SIM) and wherein each subscriber identifier is an IMSI.

3. The system as claimed in claim 1 wherein the wireless device comprises both wired and wireless local area network interfaces for a plurality of remote assets.

4. The system as claimed in claim 1 wherein the network selection rules select the wireless network to use based on an identity of the remote asset that has provided the data to transmit.

5. The system as claimed in claim 1 wherein the network selection rules select the wireless network to use based on data transmission costs.

6. The system as claimed in claim 1 wherein the network selection rules select the wireless network to use based on both an identity of the remote asset that has provided the data to transmit and data transmission costs.

7. The system as claimed in claim 1 further comprising a device management platform for receiving the data from the wireless data-transfer device connected to the remote asset and for communicating control commands to the remote asset via the wireless data-transfer device.

8. The system as claimed in claim 1 further comprising a subscriber management platform for subscriber provisioning, the subscriber management platform enabling creation, activation, deactivation and removal of subscriber accounts.

9. The system as claimed in claim 1 wherein the remote asset is a utility meter.

10. The system as claimed in claim 1 wherein the remote asset is a vehicle.

11. The system as claimed in claim 1 wherein the remote asset is a tele-health monitor.

12. The system as claimed in claim 1 wherein the remote asset is a household appliance.

13. A method of using a wireless data-transfer device to transmit data from a remote asset to a recipient, the method comprising:
   receiving at the wireless data-transfer device one or more subscriber identifiers for different wireless networks;
   collecting the data via an interface of the wireless data-transfer device that is connected to the remote asset;
   determining, by applying network selection rules, which one of a plurality of wireless networks to utilize for transmitting the data to the recipient; and
   establishing wireless communication with one of the wireless networks by selecting a subscriber identifier stored in a memory of the wireless data-transfer device.

14. The method as claimed in claim 13 wherein the subscriber identifier is an IMSI.

15. The method as claimed in claim 13 wherein the step of receiving the one or more subscriber identifiers is accomplished over the air by wireless communication with a subscriber management platform.

16. The method as claimed in claim 13 further comprising receiving data from multiple remote assets connected to the same wireless data-transfer device.

17. The method as claimed in claim 16 wherein the step of determining which one of the plurality of wireless networks to use comprises selecting the wireless network based on an identity of the remote asset providing the data to transmit.

18. The method as claimed in claim 17 wherein determining which one of the plurality of wireless networks to use comprises selecting the wireless network based also a consideration of data transmission costs.

19. An integrated circuit chip for use in a wireless data-collection system, the chip comprising:
   a memory for storing a plurality of different subscriber identifiers; and
   logic implementing network selection rules for selecting one subscriber identifier from among the plurality of subscriber identifiers stored in the memory of the chip, each subscriber identifier corresponding to a different wireless network over which asset data from a remote asset may be communicated to a recipient wherein at least one of the different subscriber identifiers is received over the air.

20. The chip as claimed in claim 19 wherein the subscriber identifier is an IMSI.

21. The chip as claimed in claim 19 wherein the logic for selecting the subscriber identifier for the wireless network to use comprises determining which one of a plurality of remote assets has provided the data to transmit.

22. The chip as claimed in claim 21 wherein the logic for selecting the subscriber identifier for the wireless network to use is also based on data transmission costs.

23. A wireless data-collection device for collecting data about a remote asset, the device comprising:
   a radiofrequency transceiver for wirelessly transmitting the data; and
   an integrated circuit chip having a memory for storing a plurality of IMSI subscriber identifiers corresponding to different wireless networks and a processor for applying network selection rules to select one IMSI corresponding to one wireless network for transmission of the data, wherein the wireless data-transfer device is configured to wirelessly receive a new subscriber identifier for a new wireless network.

* * * * *